United States Patent Office 3,842,005
Patented Oct. 15, 1974

3,842,005
PROCESS OF FLOCCULATING AQUEOUS SUSPENSIONS WITH CATIONIC STARCH ETHERS
Kenneth B. Moser and Frank Verbanac, Decatur, Ill., assignors to A. E. Staley Manufacturing Company, Decatur, Ill.
No Drawing. Continuation-in-part of application Ser. No. 51,605, July 1, 1970. This application Jan. 24, 1972, Ser. No. 220,386
Int. Cl. C02b 1/20; C02c 3/00; B01d 21/01
U.S. Cl. 210—47
9 Claims

ABSTRACT OF THE DISCLOSURE

Gelatinized, non-crosslinked quaternary ammonium starch ethers having a D.S. (degree of substitution) of at least 0.7 have unusually high flocculating capacities when employed to clarify aqueous suspensions. When freed from low molecular weight quaternary ammonium impurities or all low molecular weight ionic impurities, these starch ethers retain substantially all of their flocculating capacity. Such quaternary ammonium starch ethers are prepared by reacting starch with monofunctional etherifying reagents which are substantially free of polyfunctional compounds capable of etherifying starch.

BACKGROUND OF THE INVENTION

This application is a continuation-in-part of our application Ser. No. 51,605 filed July 1, 1970, entitled *Cationic Starch Ether Flocculating Agents*.

Much interest has recently been expressed in quaternary ammonium ethers of starch due to their cationic nature. A formal positive charge is retained by the quaternary ammonium starch ether at both alkaline and acid pH conditions. Gelatinized quaternary ammonium starch ethers have been used as flocculating agents, or flocculants. It is generally believed that flocculation is due to the attraction between the positively charged groups of the starch ether and the negatively charged suspended bodies which then form aggregates of sufficient particle size to settle from suspension.

In the past, only quaternary ammonium starch ethers having relatively low degrees of substitution have been used as flocculants. The term "degree of substitution," or "D.S.," as used herein refers to the average number of cationic substituent groups (derived from the etherifying agent) that have become bonded to each recurring anhydroglucose unit of the starch molecule. Only the low D.S. quaternary ammonium starch ethers were used because it was generally thought that the high D.S. quaternary ammonium starch ethers would provide no additional flocculating capacity relative to the low D.S. ethers.

Prior patents actually teach away from the use of high D.S. starch ethers as flocculating agents. For example, U.S. Pat. 2,995,513, issued Aug. 8, 1961, to Paschall et al. states that the flocculating capacity of gelantinized quaternary ammonium starch ethers increases with the degree of substitution up to a level of 0.4–0.5 D.S. Beyond this D.S. level, Paschall et al. state that the flocculating capacity levels off so that there is no advantage in using a quaternary ammonium starch ether with a D.S. level greater than 0.5 (see Paschall et al. column 2, lines 19–25). The highest D.S. starch ether prepared by Paschall et al. was one having a D.S. of 0.66 in Example 13, and this particular starch ether was shown to be only about 75% as effective as a starch ether having a D.S. of 0.45 as described in Example 9 of Paschall et al. Based on Paschall et al.'s observation there was no suggestion that cationic starch ethers having D.S. levels greater than 0.5 would be effective flocculating agents. Higher D.S. quaternary ammonium starch ethers offered no advantage over the low D.S. ethers in those applications where they were tried. Because low D.S. starch ethers are less expensive to prepare, they have been used in preference to high D.S. starch ethers as flocculating agents.

For certain applications, such as flocculation of dilute aqueous clay suspensions, the low D.S. quaternary ammonium starch ethers are inadequate, and until now synthetic coagulants have been used in these situations at a substantially greater cost. Another disadvantage of these synthetic coagulants is that they are generally not biodegradable. There is a definite commercial need for an effective flocculating agent to replace synthetic coagulants and for many other applications. But, until now, high D.S. quaternary ammonium starch ethers were not considered because it was generally believed they were no better than, and in some cases less effective than, starch ethers with D.S. levels of 0.4–0.5.

Contrary to the teaching to be gathered from the prior art, we have made the surprising discovery that there are applications in which the flocculating capacity of quaternary ammonium starch ethers substantially increases as the D.S. of the starch ether increases above 0.7. This has proved to be true with dilute aqueous clay suspensions. Although we do not want to be limited by theoretical considerations, one plausible theory for the continued improvement in flocculating capacity at D.S. levels of 0.7 and above is that as cationic charge density continues to increase, the increased proximity of the charges on the starch molecule enhance the capacity of the quaternary ammonium starch ether to attract the negatively charged particles in suspension. When large sized aggregates are formed by this interaction, the particles readily settle from suspension.

DETAILED DESCRIPTION OF THE INVENTION

The present invention is primarily directed to flocculation of materials suspended in aqueous systems by the addition of a non-crosslinked, gelatinized quaternary ammonium starch ether with a D.S. of at least 0.7. These starch ethers can be freed from low molecular weight quaternary ammonium impurities and inorganic salts to provide suitable products for various particular applications which require a purified flocculant.

The flocculating agent of the present invention comprises a gelatinized, non-crosslinked cationic starch ether having a degree of substitution of at least 0.7 and having the following structure:

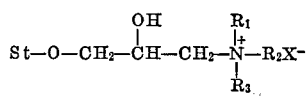

wherein St is starch, X− is an anion, and the substituents $R_1$, $R_2$ and $R_3$ are selected from the group consisting of: (1) $R_1$, $R_2$ and $R_3$ being selected from the group consisting of alkyl of up to 12 carbon atoms, cyclohexyl, phenyl and benzyl such that when the three are the same, none has more than 6 carbon atoms and, when any substituent has more than 6 carbon atoms, the other two substituents are alkyl of up to 2 carbon atoms; and (2) $R_1$ and $R_2$ forming a heterocyclic ring with said nitrogen atom, the heterocyclic ring being selected from the group consisting of morpholinyl, pyrrolidyl and piperidyl, each having up to one alkyl ring substituent of not more than two carbon atoms, and $R_3$ being a lower alkyl of up to 4 carbon atoms. Of course, it is recognized that the active flocculating species is the quarternary amonium cation.

The starch ethers preferred for use in the process of this invention may be prepared as generally set forth in U.S. Pat. 3,346,563, issued Oct. 10, 1967, to Shildneck et al. This patent, which along with the present application is assigned to a common assignee, teaches the production of low D.S. cationic starch ethers for use primarily in the papermaking industry. These low D.S. starch ethers have been found to be entirely satisfactory for papermaking applications and are, in fact, preferred over the high D.S. ethers which give inferior performance. This is yet another reason why work has been concentrated on the low D.S. ethers to the almost total exclusion of the high D.S. ethers.

The following equations show the steps of the process:

(1) $N(R_1R_2R_3) + CH_2=CH—CH_2X \rightarrow$
$CH_2=CH—CH_2—N^+(R_1R_2R_3)X^-$ (2) $CH_2=CH—CH_2—N^+(R_1R_2R_3)X^- + HOX \rightarrow$
$CH_2OH—CHX—CH_2N^+(R_1R_2R_3)X^-$
$+ CH_2X—CHX—CH_2N^+(R_1R_2R_3)X^-$ (3) $CH_2OH—CHX—CH_2N^+(R_1R_2R_3)X^-$
$MOH + Starch \rightarrow Starch\ O—CH_2$
$—CHOH—CH_2N^+(R_1R_2R_3)$.

Equation (1) shows the reaction of tertiary amine, $N(R_1R_2R_3)$, with allyl halide, $CH_2=CH—CH_2X$, to form an allyl quaternary ammonium halide, $CH_2=CH—CH_2—N^+(R_1R_2R_3)X^-$.

The allyl quaternary ammonium halide should be essentially free from excess allyl halide and allyl alcohol to avoid crosslinking of the final starch ether. Crosslinking diminishes the flocculating capacity of the ether.

The tertiary amine employed in the production of the starch ethers is selected from the group consisting of: (1) tertiary amines whose three substituents on the nitrogen atoms are selected from the group consisting of alkyl of up to 12 carbon atoms, cyclohexyl, phenyl and benzyl such that when the three substituents are the same, none contains more than 6 carbon atoms, and when any one substituent has more than six carbon atoms the other two are alkyl of up to two carbon atoms; and (2) heterocyclic tertiary amines, wherein the third substituent on the nitrogen of the ring is lower alkyl up to four carbon atoms, the heterocyclic ring being selected from the group consisting of morpholinyl, pyrrolidyl and piperidyl, each having not more than one alkyl ring substituent of up to two carbon atoms. The structural formula for these tertiary amines is:

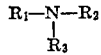

wherein $R_1$, $R_2$ and $R_3$ are the substituents, as defined immediately above, $R_1$ and $R_2$ being two substituents that can be part of a heterocyclic ring with the nitrogen atom.

Trimethylamine ($R_1$, $R_2$ and $R_3$ all being methyl) is the preferred tertiary amine because of ready availability, low cost per equivalent weight, high reactivity with allyl halides to form the quaternary ammonium salts, and high solubility in water. The quaternization reaction is preferably carried out in a water medium and the trimethyl quaternary ammonium etherifying reagents, being water soluble, are therefore preferred. In addition, the starch ethers derived from these reagents exhibit properties desirable for use as flocculating agents.

Other tertiary amines which may also be used in the reaction are as follows:

triethylamine,
triisopropylamine,
tri-n-butylamine,
N,N-dimethyldodecylamine,
N,N-dimethylcyclohexylamine,
N,N-dimethylbenzylamine,
N-methylmorpholine,
N-methylpiperidine,
N-ethylpiperidine,
N,N-dimethylaniline,
N-methylpyrrolidine,
N,N-dimethyl-2-ethylhexylamine,
N-methyl-2-methylmorpholine,
N-methyl-2-ethylmorpholine,
N-methyl-2-methylpiperidine,
N-methyl-2-ethylpiperidine,
N-methyl-2-methylpyrrolidine, and
N-methyl-2-ethylpyrrolidine.

Of the three allyl halides—chloride, bromide and iodide—allyl chloride is preferred because of its lower cost per equivalent weight for this reaction, even though it has the slowest reaction rate.

As shown in Equation (2), the allyl quaternary ammonium halide is reacted with a hypohalous acid, HOX, to yield the corresponding vicinal halohydroxypropyl derivatives, $CH_2OH—CHX—CH_2N^+(R_1R_2R_3)X^-$, $CH_2X—CHOHCH_2N^+(R_1R_2R_3)X^-$, as well as a certain amount of the vicinal dihalopropyl derivative, $CH_2X—CHX—CH_2N^+(R_1R_2R_3)X^-$. Both 2,3-vicinal halohydroxypropyl quaternary ammonium halide isomers are useful in preparing the starch ethers of the present invention. It should be noted that the halide ion associated with the allyl quaternary ammonium halide need not be the same as the halide ion associated with the hypohalous acid. That is, these two ions are independently selected from the group consisting of halide ions. Hypochlorous acid is preferred over the other hypohalous acids in Reaction (2) because of its greater selectivity to the desired halohydroxy derivative and lower cost per equivalent weight.

At this stage in the process, vicinal halohydroxypropyl quaternary ammonium halide is present in aqueous solution along with the vicinal dihalopropyl derivative and some inorganic halide obtained by neutralizing the acidic reaction medium. The solution can be concentrated by evaporation of water. After concentration, the bulk of this inorganic halide is removed by filtration; however, a small amount of the salt remains in solution. The efficiency of the starch etherification reaction increases as the concentration of the reactants is increased, and therefore, highly concentrated reagents are preferred. The terms "efficiency" and "etherification efficiency," as used herein, refer to a measure of the percentage of available starch etherifying agent that actually becomes bonded to the starch.

The starch etherification itself, Reaction (3), is performed in the presence of an alkaline catalyst. Generally, such alkaline catalysts include: (1) hydroxides, alcoholates and weak-acid salts of the alkali metals; (2) the oxides and hydroxides of calcium, barium, and strontium; and (3) quaternary ammonium bases. Specific compounds include sodium hydroxide, potassium hydroxide, lithium hydroxide, calcium oxide, calcium hydroxide, barium hydroxide, strontium hydroxide, trimethylbenzyl ammonium hydroxide, sodium methylate, sodium aluminate, trisodium phosphate and sodium silicate. Sodium hydroxide is the preferred alkaline catalyst because it is readily available and it is inexpensive.

The actual starch etherifying agent is vicinal epoxypropyl quaternary ammonium halide which can be obtained from the vicinal halohydroxypropyl derivative by reaction with the alkaline compound described above. The salt by-product that results from this reaction need not be removed from the reaction system.

The di-halopropyl quaternary ammonium halide which is present as an impurity in the vicinal halohydroxypropyl derivative is destroyed by reaction with a stoichiometric quantity of the alkaline compound described above. The di-halopropyl derivative is apparently dehydrohalogenated. The halide salt that is a by-product of the reaction between the di-halopropyl derivative and the alkaline compound does not interfere with the starch etherification reaction and need not be removed from the reaction system.

In the above reaction, it is important to provide sufficient alkaline compound to (1) catalyze the starch etherification, (2) convert the vicinal halohydroxypropyl derivative into the actual starch etherifying agent (vicinal epoxypropyl quaternary ammonium halide), and (3) destroy the vicinal di-halopropyl quaternary ammonium halide.

Pure vicinal halohydroxypropyl quaternary ammonium halide or pure vicinal epoxypropyl quaternary ammonium halide can be used to etherify the starch instead of the relatively impure vicinal halohydroxypropyl quaternary ammonium halide-vicinal di-halopropyl quaternary ammonium halide mixtures described above. The crystalline vicinal halohydroxypropyl quaternary ammonium halide may be prepared by reacting epihalohydrin and tertiary amine hydrohalide. The crystalline epoxypropyl derivative can be prepared by reacting epihalohydrin and tertiary amine in a non-aqueous solvent, such as dimethoxyethane. When either of these two halides is used to etherify starch, the amount of alkaline compound needed for etherification should be adjusted accordingly. That is, if pure vicinal halohydroxypropyl quaternary ammonium halide is used, sufficient alkaline compound must be present during starch etherification to (1) catalyze the etherification, and (2) convert the vicinal halohydroxypropyl quaternary ammonium halide to the actual etherifying reagent, vicinal epoxypropyl quaternary ammonium halide. However, if the pure vicinal epoxypropyl derivative is used, only the catalytic amount of alkaline compound is required.

The starch ethers of the present invention may be produced in the following manner. An aqueous starch slurry containing the required amount of alkaline compound to catalyze the etherification reaction is prepared. The etherifying agent or its precursor (vincinal epoxypropyl quaternary ammonium halide or vicinal halohydroxypropyl quaternary ammonium halide) is combined with any remainder of the necessary alkaline compound in a separate vessel. Less alkaline compound than is needed to produce and/or purify the etherifying agent may be added to this separate vessel in order to avoid degradation of the etherifying agent. (The remaining alkaline compound is added directly to the starch slurry.) At this point, the temperature within the separate vessel should be maintained below about 90° F. to avoid undesirable side reactions.

The starch slurry is then heated to about 120° F. and, for best results, about 10% to 20% of the etherifying reagent is added to the slurry. The starch slurry is then heated to its pasting temperature and the remainder of the etherifying agent is slowly added to the starch mixture. Alternately, to simplify the procedure, the alkaline compound and the etherifying agent (or its precursor) can be simultaneously added directly to the starch slurry, which is then pasted. Some etherification may occur before the starch is gelatinized. The starch mixture is maintained at or above its pasting temperature for about 1 to 20 hours to allow the etherification to occur.

If desired the halide ion of the starch ethers can be replaced with another anion, by means of ion exchange or other well known methods. Suitable anions include nitrate ion, acetate ion, sulfate ion, phosphate ion and the like.

For most flocculating applications, the complete reaction mass can be used without purification of any kind. However, in certain flocculation services, purification of the reaction mass may be necessary.

The starch ethers of the invention may be purified by dialysis of the crude starch ether containing the reaction mixture against distilled water to remove or separate the low molecular weight quaternary ammonium by-products and inorganic salts from the starch ether. Alternately, an ultrafiltration cell having a selectively permeable membrane can be used to retain the cationic starch ether while allowing the low molecular weight organic and inorganic impurities to pass through in the aqueous filtrate.

The starch ethers can also be purified through ion exchange. To remove the quaternary ammonium by-products, the reaction mixture is brought into contact with a sulfonic acid type cation exchange resin (in the sodium form). After this purification, the cationic starch ether remains in an aqueous solution containing inorganic impurities. Separation of the inorganic salts, plus the quaternary ammonium by-products from the starch ethers can be accomplished by treating the reaction mixture with a mixture of sulfonic acid cation exchange resin (in the acid form) and a weakly basic polyamine anion exchange resin (in hydroxyl form). This produces an aqueous solution of the quaternary ammonium starch ethers which is essentially free of low molecular weight ionic impurities.

The above purification techniques provide starch ethers which can be "tailor made" for a particular use. Only those specific impurities are removed which are objectionable to the intended use, thereby avoiding excess purification costs. The D.S. level of the starch ether produced can also be controlled to provide the optimum D.S. for the particular use contemplated.

Different types of starch will give starch ethers of different properties. This invention is applicable to all types of starch and starch fractions, including dextrins, waxy, and high-amylose varieties of starch. The starch may be derived from the root (e.g., potato, tapioca), the stem (e.g., sago), or the seed (e.g., cereals, corn, wheat or rice) of the vegetable plant. The starch may have been modified beforehand, in paste or granule form, with acids, enzymes, or heat. Also, the starch or dextrin may have been partially derivatized beforehand as, for example, by reaction with alkyl halides to form alkyl starch ethers, or by reaction with alkylene oxides to form the hydroxyalkyl ethers of starch. The important requirement is that the starch have reactive hydroxyl groups remaining after such modification. Other compounds, such as polyvinyl alcohol, and other synthetic polymers containing free hydroxyl groups, can also be used in the method of the present invention.

The types of starch used affects the character of the flocculant produced. For example, amylose will produce straight chain flocculants. Amylopectin, by contrast, produces branched chain flocculants. Mixed straight and branched chain flocculants are produced when dent corn starch is used. Potato starch will normally produce flocculants with very low levels of anionic character (i.e., the naturally occurring phosphate groups). Low molecular weight flocculants can be obtained by using hydrolyzed starch. Other substituents added to the starch molecule via well known modification reactions also influence the character of the resulting flocculant.

The high D.S. cationic starch ethers of the present invention are suitable for a wide variety of uses which include clarifying turbid water, iron oxide slurries, kaolin slurries, predispersed kaolin slurries (which are more difficult to flocculate than raw kaolin slurries), taconite slurries, coal slurries, silica slurries, sewage waste waters, calcium carbonate slurries, titanium dioxide slurries, carbon slurries, and animal slaughterhouse waste waters. Substantially all aqueous suspensions in which the solid particles carry a negative charge can be clarified by employing the cationic starch ethers of the present invention.

Systems in which the flocculating capacity of the starch ethers of the invention increase substantially beyond a D.S. level of 0.7 include kaolinite clay slurries, predispersed kaolin clay slurries, coal wash water, calcium carbonate slurries, titanium dioxide slurries, slicia suspensions, turbid water, iron oxide slurries, taconite slurries and carbon slurries. As mentioned above, such high D.S. level systems were not used before applicants' invention because it was generally believed that no improved flocculating capacity would be realized at D.S. above 0.5.

The cationic starch flocculants of the invention were tested with aqueous clay suspensions by preparing an aqueous kaolinite clay suspension, with clay concentration of 50 p.p.m. by weight. One liter of this suspension was placed in a larger container equipped with a multiple speed laboratory stirrer and mixed at 100 r.p.m. The flocculant solution (100 m.g. of reaction mixture diluted in one liter of water and thoroughly mixed) was pipetted into the kaolinite clay suspension while stirring at 100 r.p.m. and stirring was continued for 20 minutes. The stirring speed was then decreased to 15 r.p.m. for an additional 20 minutes after which the stirrer was stopped. Unless otherwise specifically noted, the turbidity measurements were made on the clarified suspension that existed 5 minutes after the mechanical stirring was stopped. The optimum dose of flocculant was determined by running several tests at various flocculant concentrations. The optimum dose is defined as the lowest dosage that gives a finished water of good clarity.

Our invention is illustrated, but not limited by the following examples.

EXAMPLE 1

A slurry of 11.37 parts dry substance hydrolyzed corn starch, having a 5 gram alkali fluidity of 70 cc., and 37.00 parts of water was prepared. Localized pasting of the starch was avoided by adding 2.18 parts of a 15 wt. percent aqueous sodium hydroxide solution to the slurry. Unless otherwise specified, weight parts are used throughout the examples.

In a separate tank, equipped with cooling coils, 11.20 parts of a 50 wt. percent aqueous sodium hydroxide solution was slowly added to 33.43 parts of a reagent with a typical composition of:

74 wt. percent chlorohydroxypropyltrimethyl ammonium chloride
6 wt. percent dichloropropyltrimethylammonium chloride
2 wt. percent sodium chloride
18 wt. percent water This reagent can be produced by first reacting allyl chloride with trimethylamine. The product is then reacted with hypochlorous acid. These two reactions are discussed in much detail in U.S. Pat. 3,346,563. The production of the reagent is completed by evaporation of a portion of the aqueous reaction medium, and any by-product salt is removed, for example by filtering or centrifuging.

Efficient stirring and cooling was provided to rapidly disperse the sodium hydroxide throughout the reagent. The reagent mixture was maintained below 60° F. during and after the addition of alkali. At this point some sodium chloride precipitated from the mixture; however, this salt was kept in suspension by stirring and no attempt was made to remove it.

The starch slurry was slowly heated. When the temperature of the slurry reached 80° F., 6.00 parts of the reagent mixture was added to the slurry. The temperature of the slurry was slowly increased to 160° F., which was sufficient to paste the starch. As the starch started to paste, the remainder of the reagent mixture was slowly added. This gradual addition of the reagent mixture occurred over about a one-hour period. The tank which contained the reagent mixture was rinsed with 2.64 parts of water, which was then added to the starch paste. The temperature of the starch paste was maintained at 160° F. for 5 hours after all the reagent mixture had been added. The starch pasted was as then cooled to 100° F. and 32 wt. percent aqueous hydrochloric acid was used to neutralize the mixture to a ph of 6.5, ±0.5. If necessary, 15 wt. percent aqueous sodium hydroxide can be used to back titrate.

The resulting gelatinized quaternary ammonium starch ether was substantially free of crosslinking and had a D.S. of 1.02.

This starch ether was tested in the laboratory in clay flocculation service. The measure of performance was Jackson Turbidity Units (J.T.U.). Following the general procedure outlined previously, the turbidity of a clay suspension with 50 p.p.m. clay was reduced from approximately 82 J.T.U. to 14.0 J.T.U. and 3.8 J.T.U. by the addition of 0.11 and 0.18 p.p.m. of the starch ether, respectively. Throughout the examples, starch ether concentrations are based on dry substance starch ether.

EXAMPLE 2

In this example, pure vicinal halohydroxypropyl quaternary ammonium halide was used to produce flocculants for an aqueous clay suspension.

A slurry of 36.4 parts of a hydrolyzed corn starch, having a 5 gram alkali fluidity of 70 cc., 128.0 parts of water, and 1.6 parts of a 50 wt. percent aqueous sodium hydroxide solution was prepared and heated to 122° F. In a separate holding tank, a solution of 80.0 parts of vicinal chlorohydroxypropyltrimethylammonium chloride, 38.0 parts of water and 34.0 parts of 50 wt. percent aqueous sodium hydroxide was made up so that the temperature was kept below about 86° F. One half of the vicinal chlorohydroxypropyltrimethylammonium chloride solution was added to the starch mixture. The temperature of the starch mixture was increased to about 160° F. and the other half of the reagent solution was added dropwise over a one hour period. The tank in which the reagent solution was prepared was rinsed with 10.0 parts of water which was then added to the starch paste. The paste was maintained at about 160° F. for 5 additional hours, after which the mixture was cooled and neutralized to a pH of 6.7 with concentrated hydrochloric acid.

The resulting non-crosslinked gelatinized cationic quaternary ammonium starch ether had a D.S. of 1.02, and reduced the turbidity of an aqueous clay suspension with 50 p.p.m. clay from 77 J.T.U. to 7.3 J.T.U. and 4.0 J.T.U. by the addition of 0.10 and 0.17 p.p.m. of the starch ether, respectively.

EXAMPLE 3

Example 2 was repeated except that the starch used was an unmodified corn starch. The resulting starch ether had a D.S. of 0.93. This starch ether reduced the turbidity of a clay suspension with 50 p.p.m. clay from 77 J.T.U. to 6.1 J.T.U. and 4.9 J.T.U. by the addition of 0.16 and 0.32 p.p.m. of the starch ether, respectively.

EXAMPLE 4

Example 2 was repeated except that the hydrolyzed starch used was one which had a 5 gram alkaline fluidity of 90 cc. The resulting quaternary ammonium starch ether had a D.S. of 0.99, and reduced the turbidity of the 50 p.p.m. clay suspension from 77 J.T.U. to 6.1 J.T.U. and 4.0 J.T.U. by the addition of 0.10 and 0.17 p.p.m. of this starch ether, respectively.

Examples 2, 3 and 4 particularly illustrate the fact that even though the D.S. of the starch ethers are relatively constant, the flocculating capacity is dependent on the type of starch used.

EXAMPLES 5–6

Examples 2 and 4 were repeated except that the amount of water used to slurry the starch was halved. Example 5 corresponds to Example 2 and Example 6 to Example 4. Each of the resulting starch ethers was tested in clay flocculation service and found to be satisfactory flocculants. The table below gives a comparison of the D.S. of these ethers with that of the ethers prepared in Examples 2 and 4.

TABLE

| Example: | Starch ether, D.S. |
|---|---|
| 2 | 1.02 |
| 5 | 1.07 |
| 4 | 0.99 |
| 6 | 1.07 |

The above table supports the conclusion that etherification efficiency is increased as the water concentration is decreased.

EXAMPLES 7-10

The following examples illustrate the effect of starch ether D.S. on clay flocculating capacity. A slurry composed of 32 parts of a hydrolyzed corn starch with a 5 gram alkaline fluidity of 90 cc. and 89 parts of water was prepared. The slurry was pasted by stirring and heating to about 200° F. followed by cooling to about 113° F. Stirring was continued while 3.2 parts of 50 wt. percent aqueous sodium hydroxide (a catalytic amount) was added. The desired amount of the actual etherifying agent, 2,3-epoxypropyltrimethylammonium chloride, was added and the reaction was allowed to continue overnight. The amount of etherifying agent added depends on the D.S. desired for the resulting starch ether. After cooling, the pH of the starch mixture was adjusted to 6.5±0.2 with hydrochloric acid.

The resulting gelatinized quaternary ammonium starch ethers are substantially free of cross-linking. The compilation below shows how the clay flocculating capacity of these starch ethers is dependent on the D.S. of the starch ether.

TABLE

| Example | Wt. etherifying agent used/wt. dry substance starch | D.S. | Charge density [1] of starch ether | Optimum dose for clay flocculation, p.p.m. starch ether |
|---|---|---|---|---|
| 7 | 0.77 | 0.82 | $2.87 \times 10^{-3}$ | 0.23 |
| 8 | 0.77 | 0.63 | $2.45 \times 10^{-3}$ | 0.42 |
| 9 | 0.52 | 0.40 | $1.79 \times 10^{-3}$ | 0.43-0.86 |
| 10 | 0.26 | 0.21 | $1.08 \times 10^{-3}$ | 1.80 |

[1] The term "Charge Density" as used herein is defined as $$\text{Charge Density} = \frac{C \times D.S.}{162 + D.S. (MW_s - 1)}$$

Where:

C is the number of cationic charges per substituent group.*

D.S. is the degree of substitution, as defined previously.

162 is the molecular weight of a recurring anhydroglucose unit, and $MW_s$ is the molecular weight of the substituent group.

These figures clearly illustrate that the clay flocculating capacity of these starch ethers continues to increase as the D.S. increases beyond 0.40 and 0.63 up to at least 0.82.

EXAMPLES 11-15

These examples illustrate that as the starch ether charge density increases (an inherent result of an increase in D.S.), the number of cationic charges needed for a given flocculating application decreases. The starch ethers were prepared in a manner similar to that of Example 1.

The flocculating capacity of these starch ethers was tested using an aqueous slurry of 320 p.p.m. of a kaolin coating clay predispersed with approximately 0.30% by weight of (based on clay) tetrasodium pyrophosphate. The turbidity of this slurry initially was about 530 J.T.U. The amount of starch ether necessary to clarify this clay suspension to 40 J.T.U. was determined and this value was translated into number of cationic charges necessary to flocculate one ton of clay from suspension. The results of these tests and calculations are presented below.

TABLE

| Example | Starch ether, D.S. | Charge density | Number of cationic charges per ton of clay flocculated | Pounds of starch ether per ton of clay flocculated |
|---|---|---|---|---|
| 11 | 0.145 | $0.79 \times 10^{-3}$ | $3.42 \times 10^{24}$ | 15.86 |
| 12 | 0.305 | $1.47 \times 10^{-3}$ | $3.17 \times 10^{24}$ | 7.88 |
| 13 | 0.52 | $2.16 \times 10^{-3}$ | $2.58 \times 10^{24}$ | 4.37 |
| 14 | 0.70 | $2.61 \times 10^{-3}$ | $2.32 \times 10^{24}$ | 3.35 |
| 15 | 1.00 | $3.19 \times 10^{-3}$ | $2.02 \times 10^{24}$ | 2.31 |

These results indicate that as the cationic charge density of starch ethers increases, the flocculating capacity of each individual charge increases. Apparently, two single cationic charges in close proximity act to some extent as a single double charge and this effect increases as the single cationic charges are brought closer together (as the charge density increases). These examples clearly demonstrate the superior flocculating capacity of the high D.S. (greater than 0.7) ethers of the present invention as compared to the ethers described in U.S. Pat. 2,995,513, particularly in Example 16.

EXAMPLES 16-18

The following examples indicate that the starch ethers employed in this invention can be purified by various means without losing any substantial part of their flocculating capacity.

The ethers used in these examples were prepared in a manner similar to those used in Example 1. However, once the etherification reaction was completed, the ethers were freed of various contaminants by three purification techniques—dialysis, ultrafiltration and ion exchange.

The ether treated by the dialysis technique (against distilled water using regenerated cellulose tubing having an average pore radius of 24 angstroms) was freed low molecular weight quaternary ammonium impurities, such as unreacted etherifying agent, and inorganic salts. Ultrafiltration (using a membrane through which molecules having a molecular weight less than about 100,000 are able to pass) also removed low molecular weight impurities from the starch ether. By treating 30 parts of the starch etherification reaction mixture with 100 parts of a sulfonic acid cation exchange resin in acid from (Rohm & Haas IR-120H resin) and 100 parts of a weakly basic polyamine anion exchange resin in hydroxyl form (Rohm & Haas IR-45 resin), the starch ether is essentially freed of quaternary ammonium impurities and inorganic salts.

These purified quaternary ammonium starch ethers were tested in clay flocculation service. The results of these tests are summarized below:

| Example | Method of purification | D.S. | Clay flocculation test J.T.U., p.p.m. starch ether 0.08 | 0.10 |
|---|---|---|---|---|
| Unpurified ether | | 1.02 | 12 J.T.U. | 5 J.T.U. |
| 16 | Dialysis | 1.04 | 13 J.T.U. | 5 J.T.U. |
| 17 | Ultrafiltration | 1.02 | 13 J.T.U. | 5 J.T.U. |
| 18 | Ion exchange | 1.02 | 14 J.T.U. | 5 J.T.U. |

The above compilation indicates that the purified starch ethers are only very slightly reduced (if reduced at all) in their flocculating capacities compared to the unpurified ether.

In certain applications, such as production of potable water, it is necessary to use a purified flocculant, and the purified quaternary ammonium starch ethers tested proved to be very effective flocculating agents.

EXAMPLE 19

Sludge conditioning in vacuum filtration system

The flocculating agent of the invention was used successfully in a large municipal sewage waste treatment plant which employed a vacuum filtration system incorporating vacuum coil-type filters, presently manufactured by Komline-Sanderson Engineering Corp. of Peapack, N.J. In these runs, the flocculating agent of the invention was substituted for a more expensive synthetic cationic flocculating agent which had been used in the plant for about three years. Comparisons were made between the two flocculating agents with the following results:

TABLE

| Flocculating agent | Sludge prodn., dry tons/day | Percent solids of cake | Relative cost per dry ton |
|---|---|---|---|
| Applicants' high D.S. cationic starch ether | 45.8 | 27.5 | $1.49 |
| Synthetic cationic polymer | 40.0 | 26.9 | $1.84 |

In all the above tests upon which the above comparisons

*Substituent group refers to that part of the etherifying agent that becomes bonded to the starch molecule.

were based, the waste effluents were conditioned with about 3–5% by weight of the same anionic polymer, based on the dry weight of the particular flocculating agent, prior to the addition of the flocculating agent. The respective flocculating agents were added to the waste liquor just prior to the point in the system where the waste liquor enters the sludge filters (described above). The comparisons for the synthetic flocculating agent were based on a series of about seven eight hour filtering runs, three of which were made "end-to-end" with applicants' three eight hour test runs. The annual cost saving by using applicants' product has been calculated for this particular plant to be about $10,000, based on present prices as set forth above.

It is also believed at present that the flocculating agent of the invention leaves behind a more natural solids residue because of the starch component, and this fact should make more feasible the ultimate disposal of the wastes through land fill, combustion-incineration, fertilizer manufacture, or other similar means.

EXAMPLE 20

Paper pulp mill-process water purification

Applicants' flocculating agent has also been used successfully in paper pulp mills in the recovery of chemicals from alkaline cooking liquors, referred to as the "white and green liquors" and in the "mud washers." In the typical pulp recovery system, strong black liquor containing sodium compounds, and organic chemicals is converted to green liquor by first burning it in a recovery furnace and by adding make-up chemicals, such as sodium sulfate, and placing the mixture in a dissolving tank. The flocculating agent is added to the green liquor as it flows from the dissolving tank into the green liquor clarifier, and is used to remove carbon and other insoluble particles suspended in the green liquor. Applicants' flocculating or settling effect on green liquor was observed and compared to a control run with the following results:

TABLE.—PULP MILL GREEN LIQUOR—SETTLING EFFECT OBSERVED

| Control (no flocculating agent) settling effect | Time, minutes | Applicant' flocculating agent (10 p.p.m.) settling effect |
|---|---|---|
| No settling | 5:00 | Coagulated and settling. |
| Starting to coagulate | 10:00 | Settled, supernatant clear. |
| Very little settled, supernatant cloudy. | 25:00 | Do. |

It can be seen from the above data that applicants' flocculating agent has very definite and visible settling effects in the pulp liquor processing. In addition to using the new flocculating agent of this invention at this point in the pulp liquor processing, it can also be added to the "white liquor" which is derived from the clarified green liquor. This second addition insures that all of the solid calcium carbonate is completely removed from the recovered chemicals prior to recycling them to the paper pulp digester. Careful and judicious use of pulp processing waters and chemicals is especially important in those states where strict enforcement of clean water laws is being carried out. In addition, it makes good sense in production economies to recycle as much of the pulp digester chemicals as possible, besides the good sense associated with improving the public image of pulp processors.

EXAMPLE 21

Clarification of coal mining wash waters

The flocculating agent of the subject invention was compared to "Synthetic A," a commercially accepted synthetic cationic polymer, which is presently used in clarifying coal processing wash waters which contain substantial levels of suspended clay. The results observed were as set forth below:

TABLE.—SETTLING EFFECT OBSERVED

| 1 p.p.m. anionic/ Synthetic A (10 p.p.m), time, min. | Level/time— 1,000 ml. cyl., level-ml. | 1 p.p.m. anionic/ applicants' flocculating agent (10 p.p.m), time, min. |
|---|---|---|
| :27 | 900 | :17 |
| :46 | 800 | :37 |
| 1:05 | 700 | :45 |
| 1:25 | 600 | :57 |

The Synthetic A is a commercial available flocculating agent which has been used for several years by coal mining companies in wash water processing, and its performance has been accepted by them as standard. In reading Table II, it can be seen that applicants' flocculating agent outperformed the commercially accepted flocculating agent, Synthetic A, by more than about 150% on settling level comparison. It took one minute, 25 seconds to accomplish the same level of settling effect with Synthetic A as was observed after only 57 seconds with applicants' flocculating agent, all other conditions being the same. In a coal mining wash water purifying system, this represents a substantial cost saving in capital investment for wash water purification. In addition, the present cost per ton of the flocculating agent of the invention is about $240 less than the cost per ton for Synthetic A. Disposal problems are expected to be less for applicants' flocculating agent residues, for the same reasons as mentioned above in Example 19.

Since many embodiments may be made of this invention and since many changes may be made in the embodiments thereof, the following is to be interpreted as illustrative only and the invention is defined by the claims appended hereafter.

What is claimed is:

1. The process of flocculating material from an aqueous suspension comprising treating said aqueous suspension with a gelatinized, non-crosslinked quaternary ammonium starch ether having a D.S. of at least 0.7 and having a structure selected from the group consisting of:

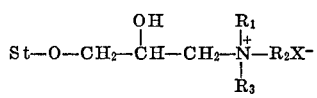

wherein St is starch, $X^-$ is an anion, and the substituents $R_1$, $R_2$ and $R_3$ are selected from the group consisting of alkyl of up to 12 carbon atoms, such that when the three substituents are the same, none has more than 6 carbon atoms, and when any substituent has more than 6 carbon atoms, the other two substituents are alkyl of up to 2 carbon atoms; and $R_3$ is a lower alkyl of up to 4 carbon atoms, said starch ether having a charge density of about $2.61 \times 10^{-3}$, and having at least 200 anhydroglucose units per starch ether molecule, said starch ether being substantially free of residual crosslinking agents including polyfunctional starch etherifying agents and dihalo organic crosslinker reaction by-products and about 3.35 lbs. said starch ether being capable of flocculating about 1 ton of clay from an aqueous suspension of 320 p.p.m. of a kaolin coating clay predispersed with approximately 0.30% by weight of tetrasodium pyrophosphate, based on the weight of clay, said aqueous suspension having an initial turbidity of about 530 J.T.U., to a final turbidity of less than about 40 J.T.U.

2. The process of claim 1, wherein $X^-$ is a chloride ion.

3. The process of claim 1, wherein $R_1$, $R_2$ and $R_3$ are methyl groups.

4. The process of claim 1, wherein $X^-$ is a chloride ion and $R_1$, $R_2$ and $R_3$ are methyl groups.

5. The process of claim 4 wherein said starch ether is capable of flocculating said aqueous suspension when treated with about 2.31 to 3.35 pounds of said starch ether per ton of suspended solids to be flocculated, said starch ether being derived from the alkaline reaction of vicinal epoxypropyl quaternary ammonium chloride which generate dihalopropyl by-products and having substantially all of said dihalopropyl by-products transformed into salts by the excess alkali present in the reaction mixture, and in which the aqueous suspension is slaughterhouse wastes.

6. The process of claim 5, wherein said aqueous suspension comprises kaolin clay and tetrasodium pyrophosphate.

7. The process of claim 1, in which the aqueous suspension is a sewage waste liquor, and including the steps of first conditioning the sewage waste liquor by adding about 3–5% by weight of a synthetic anionic polymer, based on the dry weight of said quaternary ammonium starch ether.

8. The process of claim 1, in which the aqueous suspension is the spent liquor resulting from a pulp mill digester system, and the flocculating agent is added selectively to clarify the green liquor, the white liquor, and to aid operation of the "mud" washers.

9. The process of claim 1, in which the aqueous suspension is a clay-rich aqueous suspension of coal mining wash water, and including the step of adding about 1 p.p.m. anionic material to the wash water prior to the addition of said quaternary ammonium starch ether.

References Cited

UNITED STATES PATENTS

| | | | |
|---|---|---|---|
| 2,995,513 | 8/1961 | Paschall et al. | 260—233.3 R |
| 2,975,124 | 3/1961 | Caldwell et al. | 210—54 |
| 3,259,570 | 7/1966 | Priesing et al. | 210—53 |
| 3,479,282 | 11/1969 | Chamot et al. | 210—54 |
| 3,001,933 | 9/1961 | Malinowski | 210—54 |
| 3,453,257 | 7/1969 | Parmerter et al. | 210—54 X |

FOREIGN PATENTS

| | | | |
|---|---|---|---|
| 715,566 | 8/1965 | Canada | 260—233.3 R |

THOMAS G. WYSE, Primary Examiner

U.S. Cl. X.R.

210—54; 260—233.3 R

UNITED STATES PATENT OFFICE
CERTIFICATE OF CORRECTION

Patent No. 3,842,005      Dated October 15, 1974

Inventor(s) Kenneth B. Moser and Frank Verbanac

It is certified that error appears in the above-identified patent and that said Letters Patent are hereby corrected as shown below:

Column 1, line 31; for "1970, entitled" read ---1970, now abandoned, entitled---
Column 3, line 12; for "+CH = CH" read ---+$CH_2$ = CH---
Column 3, line 13; for "$CH_2$ = $CH_2$ - $CH_2$" read ---$CH_2$ = CH - $CH_2$---
Column 3, line 14; for "X HOX" read ---$X^-$ + HOX---
Column 3, line 17; for "X MOH" read ---$X^-$ + MOH---
Column 4, line 15; for "corersponding" read ---corresponding---
Column 7, line 64; for "pasted was as then" read ---paste was then---
Column 7, line 66; for "ph" read ---pH---
Column 9, Example 7; for "0.77" read ---1.125---
Column 9, Example 14; for "2.32 x $10^{34}$" read ---2.32 X $10^{24}$---
Column 10, line 29; for "from" read ---form---
Column 10, line 40; for "ther" read ---Ether---

Signed and sealed this 18th day of March 1975.

(SEAL)
Attest:

RUTH C. MASON
Attesting Officer

C. MARSHALL DANN
Commissioner of Patents
and Trademarks